(12) United States Patent
Wright

(10) Patent No.: US 6,445,407 B1
(45) Date of Patent: Sep. 3, 2002

(54) 3-DIMENSIONAL VISUAL SYSTEM

(76) Inventor: Donald Edward Wright, 113 Prairie View, Red Oak, TX (US) 75154

( * ) Notice: Subject to any disclaimer, the term of this patent is extended or adjusted under 35 U.S.C. 154(b) by 0 days.

(21) Appl. No.: 09/206,661

(22) Filed: Dec. 7, 1998

(51) Int. Cl.[7] .................... H04N 13/04; H04N 15/00
(52) U.S. Cl. ........................................ 348/51; 353/74
(58) Field of Search .................. 348/51, 54, 42, 348/53, 787, 789, 794, 819, 836; 359/478, 466, 477; 312/7.2; 353/7, 10, 74, 76, 119; 345/6

(56) References Cited

U.S. PATENT DOCUMENTS

| | | | |
|---|---|---|---|
| 2,884,833 A | * | 5/1959 | Pole |
| 2,922,998 A | * | 1/1960 | Stevenson |
| 2,986,969 A | * | 6/1961 | Muncheryan |
| 4,049,339 A | * | 9/1977 | Ledan |
| 4,333,707 A | * | 6/1982 | West |
| 4,535,354 A | * | 8/1985 | Rickert ........................ 348/52 |
| 4,623,223 A | * | 11/1986 | Kempf ....................... 359/472 |
| 4,701,801 A | * | 10/1987 | Hobbins et al. ............ 348/819 |
| 4,799,763 A | * | 1/1989 | Davis et al. |
| 5,394,198 A | * | 2/1995 | Janow ....................... 348/14.11 |
| 5,669,685 A | * | 9/1997 | Kotani et al. ................ 353/28 |
| 5,886,818 A | * | 3/1999 | Summer et al. .............. 353/10 |
| 6,062,693 A | * | 5/2000 | Sato .............................. 353/7 |
| 6,069,649 A | * | 5/2000 | Hattori ........................ 348/42 |

FOREIGN PATENT DOCUMENTS

| | | | | |
|---|---|---|---|---|
| FR | 1101550 | * | 4/1955 | |
| JP | 405127660 A | * | 5/1993 | .......... H04N/13/04 |

* cited by examiner

Primary Examiner—Vu Le
(74) Attorney, Agent, or Firm—Steptoe & Johnson PLLC

(57) ABSTRACT

A personal visual system, 3 dimensional enhancer. Designed as a work or entertainment center. Utilizing a monitor or television and concave spherical mirror that reflects a image generated from the monitor to itself, the mirror, and then to the observers eye that receives the enhanced and enlarged illusion of a 3 dimensional image. The monitor is positioned under the table top, and is shielded with co-netic material to keep the user safer from the electromagnetic field. The monitors position also clears the table surface where the objects of the work can be ergonomically positioned.

21 Claims, 3 Drawing Sheets

3-DIMENSIONAL VISUAL SYSTEM

BACKGROUND

1. Field of the Invention

This invention relates to personal visual systems specifically to 3 dimensional, user friendly visual systems.

2. Description of Prior Art

Personal visual systems in the prior art currently used in the home and at work are television sets and personal computers with monitors and both are 2 dimensional systems. 3 dimensional graphic are enhancing the screens but have along way to go. Personal computers use a desk top monitor that is usually very close to the user face. These monitors give off electromagnetic fields that are questionable to the observers health and especially those who use them for long periods of time. These monitors also are known to cause eye strain. With the monitor directly in front of the observer, the work to be performed must be placed to the left or right of the monitor causing neck strain and loss of place on your paper, and so loss of time. To achieve a 3 dimensional image in the prior art is a costly undertaking. Many complicated methods have been tried and many costly methods are not only monitory but also at the expense of distortion, blurring, clarity and loss of light.

In prior art Laurice J. West, U.S. Pat. No. 4,333,707 dated Jun. 8, 1982 talks in the Summary of the invention of a method of image enhancement by means of optical bending. The optical bending means produces a horizontal shift of points in the image such that the left and right eyes of the observer see a different spacing between pairs of points. A transparent sheet is formed in such away that there is distortion of the image by the undulations. An image magnification and reduction of 5% take place, hence distortion is evident to the observer.

One such attempt at depth simulation was described in U.S. Pat. No. 4,049,339, issued Sep. 20, 1977 to Antoine Ledan. Ledan described a pair of eyeglasses for movie viewing which are designed to produce a simulated three-dimensional effect. The eyeglasses have flat, triangular-shaped lenses in an opaque frame. These lenses are arranged so that the left edge of the image on the movie screen is obscured from view through the left eye, and so that the right edge of the image is obscured from view through the right eye. The eyeglasses described by Ledan produce the sensation of depth by the so-called "window effect", i.e., by preventing the observer from determining the distance between himself and the movie screen. The effect described in the Leden patent is somewhat similar to the effect utilized to simulate depth in wide-screen and curved-screen movie systems. The purpose of the wide screen or the curved screen is to fill the observer's field of view, preventing him from seeing the edges of the screen and thereby determining the distance between his eyes and the screen.

Another approach to producing illusions of depth is described by Hugh M. Stevenson in his U.S. Pat. No. 2,922,998, dated Jan. 26, 1960. Stevenson described a television having, in front of the picture area, a sheet of transparent material with opaque or translucent vertical lines. According to Stevenson, the illusion of depth is due to the slightly different picture presentation for each eye combined with the placement of the substantially vertical parallel lines in front of and spaced apart from the plane of the picture presentation.

Another system for depth simulation was described by H. M. Muncheryan in his U.S. Pat. No. 2,986,969, dated Jun. 6, 1961. Muncheryan described a binocular device having a pair of relatively rotatable polarizers in each eyepiece. Depth of simulation was achieved by rotating the plane of polarization of one polarizing lens with respect to the other in one eyepiece until objects viewed have obtained apparent curvatures and depths. This effect is said to be more prominent in the angular range of 30 to 50 degrees between the polarization axes of the two polarizing elements. After the polarizers in one eyepiece are adjusted, the polarizing lens of the other eyepiece is rotated until the transmitted light intensity through that eyepiece is comfortable to the eye.

F. Pole, in U.S. Pat. No. 2,884,833, dated May 5, 1959, described a three-dimensional effect produced by means of a transparent, curved lenticular screen, having an array of individual lenses, which are preferable so small that they cannot be discerned by the normal eye when viewed from the normal viewing distance.

In French Pat. No. 1,101, 550, granted Apr. 20, 1955, Gilbert-Jacques Robin describes the creation of stereoscopic effects by using a transparent plate having alternately interpositioned convergent and divergent cylindrical lenses. The plate has a large number of lenses, typically one lens for each millimeter of plate width. The number of lenses is related to the locations of the image plane, the plate and the observer so that, for any given very small area on the image plane, one eye will see it reduced, and the other eye will see it enlarged.

Another prior art John R. Davis and Marlin O. Thurston U.S. Pat. No. 4,799,763 disclosed a stereoscopic projection system for viewing from an eye station a stereoscopic image composed of a 1×magnification of an image source pair. Said system comprises of a concave spherical mirror segment, two monitors, silvered prism, plano mirror and a beam splitter. To manufacture this number of optical pieces and to add in the cost of two monitors does not render this system economical at least not to the average consumer. Using two monitors in an average personal computer system would give need for an expensive upgrade of the system.

In all of the foregoing viewing systems of the prior art, a simulated three-dimensional effect is achieved at the expense of image quality. That is, each system of the prior art either partially obscures the image or produces a blurring of visual information. In the former case there is at least a loss of light from the picture, and the loss of light may be accompanied by a loss of picture information. In the latter case, blurring of visual information has a tendency to cause eyestrain, and to make viewing for extended periods of time somewhat unpleasant. Nevertheless, apparently obscuration and/or blurring have been considered essential heretofore in the production of three-dimensional effects from conventional two-dimensional images.

SUMMARY OBJECTS AND ADVANTAGES

The principal object of this invention is to provide a simple viewing system for depth simulation in which obscuration of picture information is avoided, and in which there is no blurring of visual information. It is also an object of the invention to produce depth simulation in the viewing of two-dimensional images without the need for special eyeglasses or binoculars. Still another object of the invention is to provide a viewing system for improving image detail clarity by means of magnification. It is still another object of this invention to improve the safety and health factors over some widely used viewing system. Still another object is to provide an ergonomical setup for a user friendly work or play station. Still another object is to provide an economical system that provides a 75% larger overall image.

In accordance with the invention, the foregoing objects are achieved by the use of a good quality optical concave mirror. This concave mirror produces an illusion of a 3D image captured in it. The image depth is enhanced by the filtering through of light, at the perimeter of the monitor, between the fibers of the material. The image is captured by the concave mirror and reflected to the eye of the observer. The 3D illusion is further enhanced by the tunnel effect created by the hutch partition and hutch shelf. Further the illusion is enhanced by the cutaway opening and the molding surrounding the opening which is real, and the reflected mirrors image, which is the illusion. This creates an illusion of depth, which the observer cannot distinguish between real objects and illusion.

Other advantages of the present invention include a 75% larger image area, greater than the monitor size used. For instance, a 17" diagonal monitor would be enlarged to a 23" diagonal monitor. The cost difference between these size monitors is great, making this invention economical even in the form of a convenient computer or video play station. The further ergonomic advantages are a 75% larger image makes the reading of a workstation much easier on the eyes. Another ergonomic advantage of the present invention is the valuable space directly in front of the user on the desk top is cleared for the work at hand. The systems user has a direct straight line of sight from the mirrored image to the work papers, to the computer key board. The user does not have to move their head.

Yet another advantage is the improved health and safety factor connected with the electromagnetic field produced by the monitor. Improved by means of removal of the monitor from the face and head area and shielded with a conetic magnetic material.

These and other advantages will be readily apparent to those skilled in the art upon the disclosure contained herein.

Figure 1:
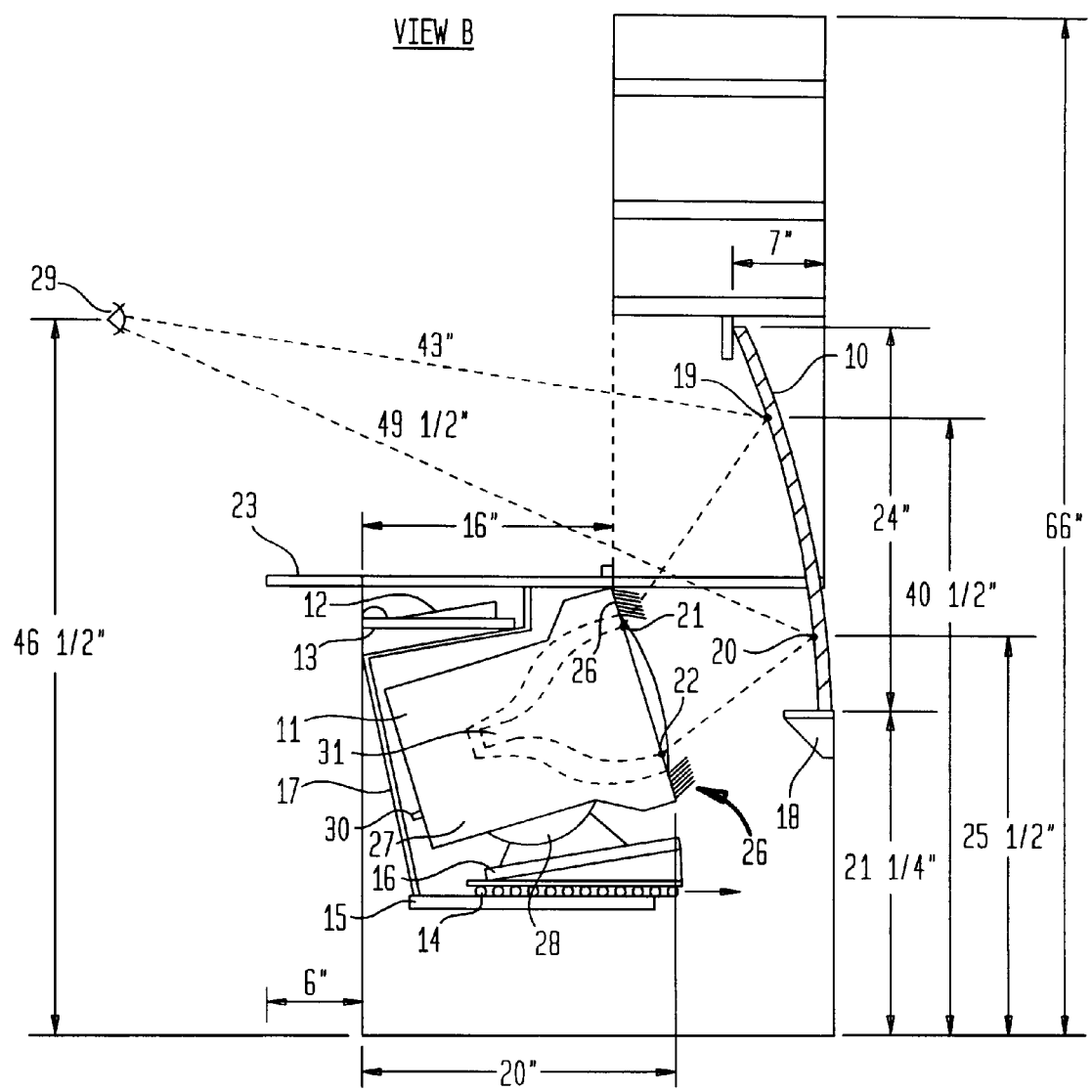
FIG. 1 is a sectional view taken from the side of FIG. 2 showing basic setup.

| Reference Numerals in Drawings | |
|---|---|
| 10 | Concave Mirror |
| 11 | CRT monitor |
| 12 | Computer Keyboard |
| 13 | Keyboard Tray |
| 14 | Slides |
| 15 | Shelf |
| 16 | Swivel base |
| 17 | Electromagnetic Shield |
| 18 | Mirror shelf |
| 19 | Mirrors upper position field-of-view |
| 20 | Mirrors lower position field-of-view |
| 21 | CRT upper position field-of-view |
| 22 | CRT lower position field-of-view |
| 23 | Table top |
| 24 | Computer Tower |
| 25 | Printer |
| 26 | Image lash |
| 27 | Cone shield |

| -continued | |
|---|---|
| Reference Numerals in Drawings | |
| 28 | Vertical control |
| 29 | Observers eye |
| 30 | Electrical Switch |
| 31 | CRT Tube |
| 32 | Cutaway opening |
| 33 | Hutch partitions |
| 34 | Cutaway opening molding |
| 35 | Hutch Shelf |
| 36 | Circuit Board |

DETAILED DESCRIPTION

With reference to the drawings, FIG. 1 the invention comprises of a desk or an entertainment center which houses a CRT monitor or television facing a concave mirror 10 that is held in position vertically by a locator such as a mirror shelf 18. The CRT monitor 11 and concave mirror 10 is angled so the image generated in the CRT monitors 11 field of view 21–22 can be picked up by the concave mirror 10 and reflected to the observers eye 29. The CRT monitor 11 is placed inside the concave mirrors 10 center of curvature and sits on a swivel base 16 for adjustment left and right. This swivel base 16 also controls parallel of the concave mirror 10 curvature and the CRT monitors 11 curvature as well as controlling trapezoidal effects if miss aligned. A vertical control 28 also allows the CRT monitor 11 to be adjusted for trapezoidal effects. Further trapezoidal and pincushion effects can be adjusted at the monitor. The swivel base 16 is setting on ball bearing slides 14 that are attached to a shelf 15. The slides 14 move the swivel base 16 and CRT monitor 11 in a forward and backward motion toward or away from the concave mirror 10.

Said forward,and backward motion controls the magnification of the image generated by the CRT monitor 11 which determines the vertical field of view 19–20 observed on the concave mirror 10. Said forward and backward motion also controls magnification of the horizontal field of view.

Figure 2:
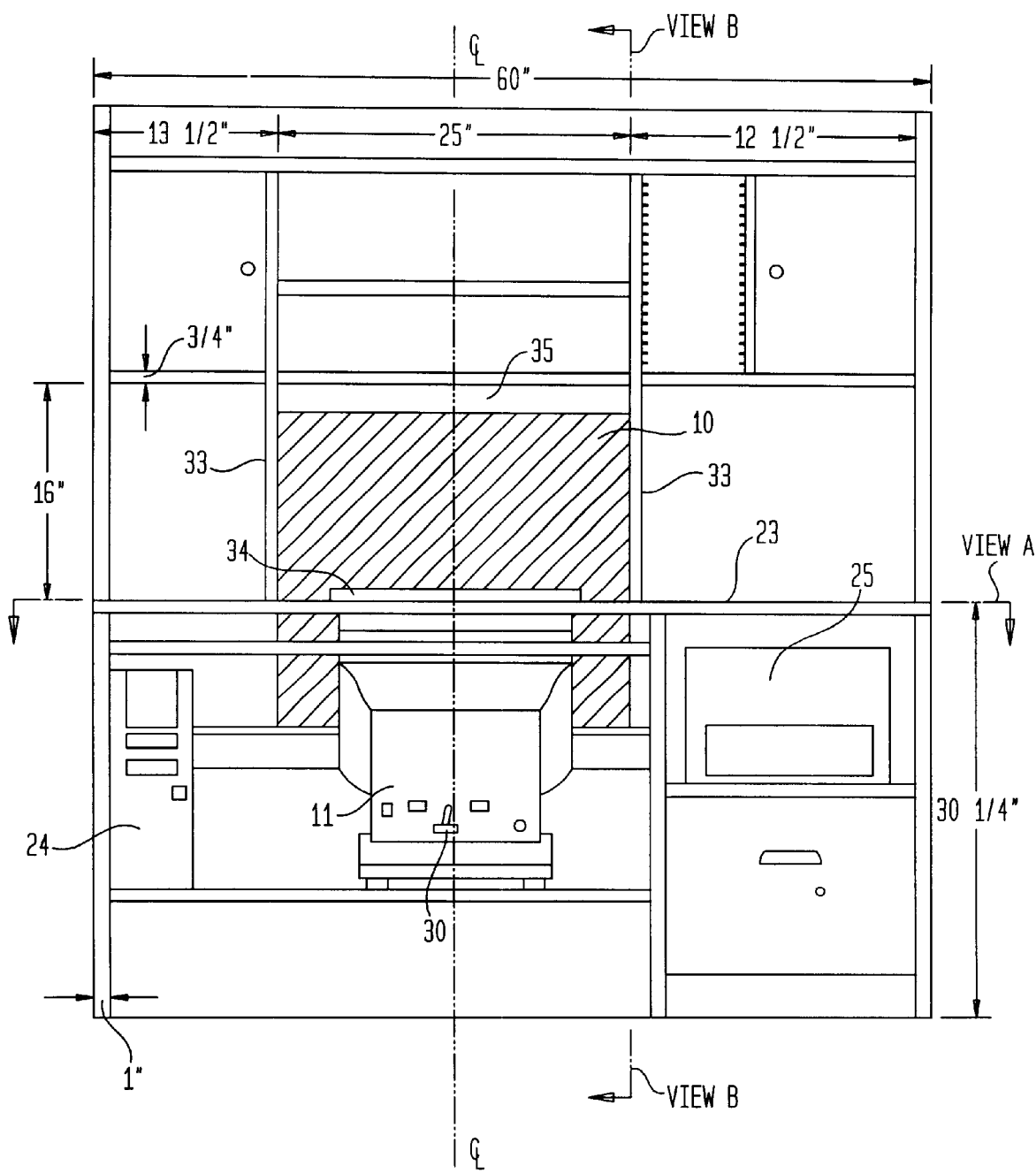
FIG. 2 is a front view as the observer would sit at the work and playstation.
Figure 3:
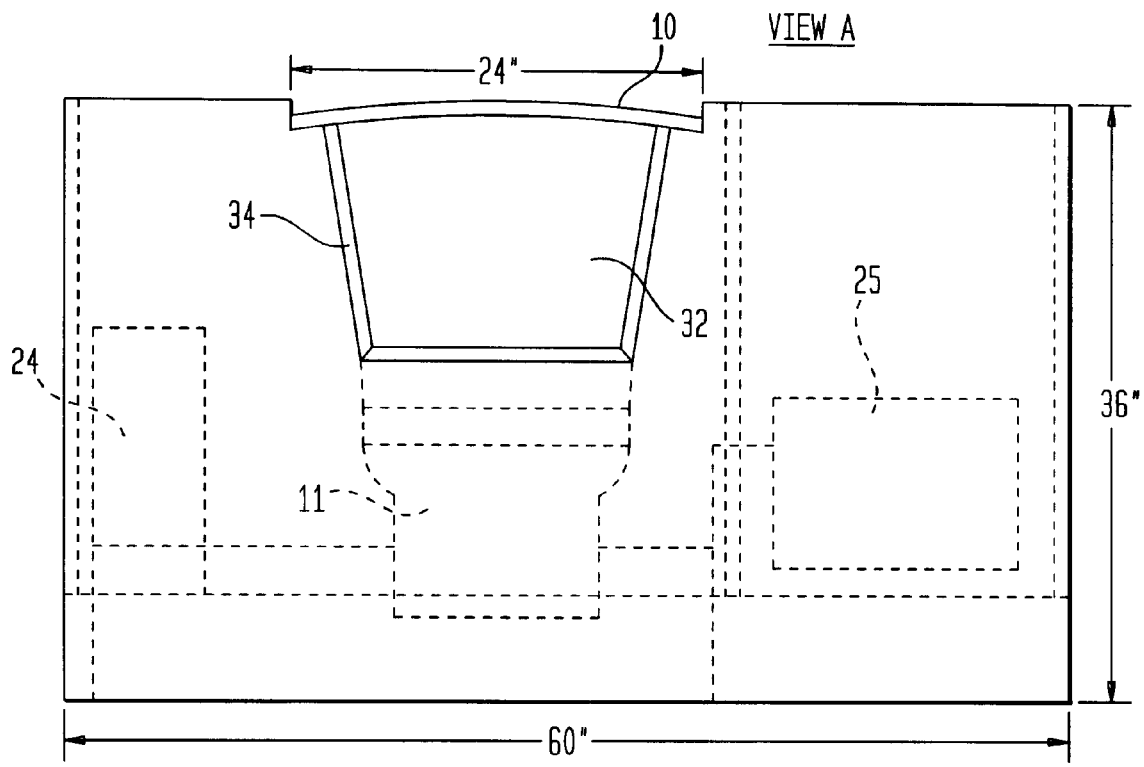
FIG. 3 is the top sectional view taken from FIG. 2 showing the cut away opening.

The image lash 26 is a fibrous material that works much like an eye lash to an eye, in the sense that the eye sees between the hair lashes then out to the image. The image lash 26 is positioned around the perimeter of the monitors field of view so the observers eyes 29 can see the light generated by the CRT monitor 11 between the fibers. This enhances the 3D illusion of depth FIG. 1. The 3D illusion is further enhanced by the tunnel effect created by the hutch partitions 33 and further enclosed on top by the hutch shelf 35. FIG. 2 Further the illusion is enhanced by the cutaway opening 32 and the cutaway opening molding 34 FIG. 3 which is a real image, and the mirror image is an illusion that appears to have doubled the effect of the cutaway opening 32 and the cutaway opening molding 34.

An electromagnetic shield 17 is placed between the observer and the CRT monitor 11. This is to keep the observer from the possible harmful effects of these electromagnetic fields. Another solution is to shield the actual component that is generating the electromagnetic field such as the cone shield 27 that is shielding the CRT tube 31 from the observer. These shields can be made of co-netic magnetic shielding alloys.

Figure 4:
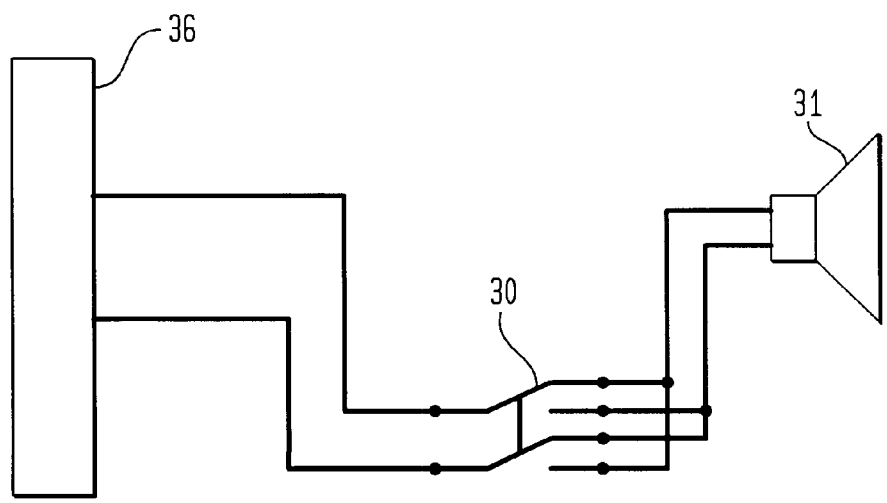
FIG. 4 is an electrical schematic showing the addition of a switch on the CRT monitor to reverse the image.

The image generated by an ordinary CRT monitor 11 or television set reads from left to right. When this image is reflected in a mirror it will be reading backward from right to left. The wires from the CRT monitors 11 internal circuit board and the CRT tube 31 that control the direction in which the CRT tube 31 receives its information are cut and diverted to a electrical switch 30 that switches the direction of the image backward or forward FIG. 4. In the backward position the CRT monitor reads right to left so the concave mirror 10 reflects the image correctly for the observer.

With the CRT monitor 11 positioned below the tabletop 23, and the computer keyboard 12 on the keyboard tray 13, the tabletop 23 is free for work. The tabletop 23 has a cut away opening 32 FIG. 3 which allows the observers eye 29 FIG. 1 to see the complete concave mirrors 10 field of view 19–20.

When this system is used in conjunction with a television set, more than one person can observe at the same time by expanding the hutch partitions outward.

I claim:

1. A personal vision system for enhancing the size and quality of an image, comprising:
   an image source having a screen of a predefined size for projecting an image;
   a concave mirror, having a predefined size greater in length and width than said predefined size of said screen of said image source, for receiving the image from said image source and generating an enhanced image;
   a desk having a work surface, a cutaway opening having a left side and a right side in said work surface, a shelf under said work surface on which said image source is positioned with said screen of said image source facing said concave mirror, a means for adjusting the position of said image source on said shelf, a mirror shelf positioned under said work surface and toward the rear of said desk for supporting said concave mirror such that said concave mirror extends partially through said cutaway opening; and
   a hutch connected to said work surface of said desk, having a left partition positioned on the left side of said cutaway opening, a right partition positioned on the right side of said cutaway opening, a hutch shelf positioned over said cutaway opening and supported by said left partition and said right partition.

2. The personal vision system according to claim 1, wherein said image source is a CRT monitor or a television.

3. The personal vision system according to claim 1, wherein said means for adjusting the position of said image source comprises a means for sliding said image source in a forward and a backward motion toward or away from said concave mirror.

4. The personal vision system according to claim 1, wherein said means for adjusting the position of said image source comprises a means for swiveling said image source in a left and right motion in relation to said concave mirror.

5. The personal vision system according to claim 1, wherein said means for adjusting the position of said image source comprises a means for adjusting a vertical alignment of said image source in relation to said concave mirror.

6. The personal vision system according to claim 1, wherein said cutaway opening is generally trapezoidal in shape.

7. The personal vision system according to claim 1, wherein said image source displays the image backwards.

8. The personal vision system according to claim 1, further comprising an electromagnetic shield positioned between a user and said image source.

9. The personal vision system according to claim 1, further comprising an image lash positioned around a perimeter of said screen of said image source.

10. The personal vision system according to claim 1, wherein said image source is positioned such that said image projected from said image source is placed inside the center of curvature of said concave mirror.

11. A method for enhancing the size and quality of an image, comprising the steps of:
    (a) projecting an image from an image source, having a screen of a predefined size, in a personal vision system, said personal vision system having:
        (i) a concave mirror, having a predefined size greater in length and width than said predefined size of said screen of said image source, for receiving the image from said image source and generating an enhanced image,
        (ii) a desk having a work surface, a cutaway opening having a left side and a right side in said work surface, a shelf under said work surface on which said image source is positioned with said screen of said image source facing said concave mirror, a means for adjusting the position of said image source on said shelf, a mirror shelf positioned under said work surface and toward the rear of said desk for supporting said concave mirror such that said concave mirror extends partially through said cutaway opening, and
        (iii) a hutch connected to said work surface of said desk, having a left partition positioned on the left side of said cutaway opening, a right partition positioned on the right side of said cutaway opening, a hutch shelf positioned over said cutaway opening and supported by said left partition and said right partition; and
    (b) positioning said image source such that said image projected from said image source is placed inside the center of curvature of said concave mirror.

12. The method according to claim 11, further comprising:
    (c) displaying said image projected from said image source backwards.

13. The method according to claim 11, wherein said position of said image source comprises the step of:
    (c) sliding said image source in a forward and a backward motion toward or away from said concave mirror.

14. The method according to claim 11, wherein said positioning of said image source comprises the step of:
    (c) swiveling said image source in a left and right motion in relation to said concave mirror.

15. The method according to claim 11, wherein said positioning of said image source comprises the step of:
    (c) adjusting a vertical alignment of said image source in relation to said concave mirror.

16. A personal vision system for enhancing the size and quality of an image, comprising:
    one concave mirror, having a predefined size greater in length and width than a predefined size of a screen of an image source, for receiving an image from said image source and generating an enhanced image;
    a desk having a work surface, a cutaway opening having a left side and a right side in said work surface, a means for supporting said image source under said work surface such that said screen of said image source faces said concave mirror, a means for adjusting the position of said image source, a means for supporting said concave mirror such that said concave mirror extends partially through said cutaway opening at the rear of said desk; and a means for creating a tunnel through which said concave mirror is viewed by a user.

17. The personal vision system according to claim 16, wherein said means for creating a tunnel comprises a hutch connected to said work surface of said desk, having a left partition positioned on the left side of said cutaway opening, a right partition positioned on the right side of said cutaway opening, a hutch shelf positioned over said cutaway opening and supported by said left partition and said right partition.

18. The personal vision system according to claim 16, wherein said means for adjusting the position of said image source comprises sliding, swiveling, and tilting said image source in relation to said concave mirror.

19. The personal vision system according to claim 16, wherein said image source displays the image backwards.

20. The personal vision system according to claim 16, further comprising an electromagnetic shield positioned between a user and said image source.

21. The personal vision system according to claim 16, further comprising an image lash positioned around a perimeter of said screen of said image source.

* * * * *